UNITED STATES PATENT OFFICE.

WINIFRED M. ROBINSON, OF SHUBENACADIE, CANADA, ASSIGNOR OF ONE-HALF TO SAMUEL M. BROOKFIELD, OF HALIFAX, CANADA.

CONCRETE.

SPECIFICATION forming part of Letters Patent No. 617,427, dated January 10, 1899.

Application filed July 26, 1898. Serial No. 686,973. (No specimens.)

*To all whom it may concern:*

Be it known that I, WINIFRED MARY ROBINSON, of Shubenacadie, in the county of Hants, in the Province of Nova Scotia, Canada, have invented certain new and useful Improvements in Concrete; and I do hereby declare that the following is a full, clear, and exact description of the same.

My invention relates to a concrete composed of small broken stones or gravel, sand or like material, and iron, which by the action of a salt solution is massed and hardened by the production of ferric hydrate.

The object of my invention is to solidify the oxidized mass to produce a concrete of greater strength, hardness, and durability than the concrete specified.

My invention consists in the addition thereto of flour of sulfur and wetting the dry mixture with a saturated solution of silicate of soda.

A concrete now in use and of which my invention is an improvement is composed of a mixture of small broken stone or gravel and sandy or earthy matter mixed with a variable proportion of iron in a low state of oxidation or metallic iron comminuted, crushed hematite, or powdered, or sulfate of iron mixed dry and when placed in position wetted with brine or other like saturated alkaline solution to effect massing and hardening. I have found that this concrete while excellent under certain conditions is improved for roadwork by the addition of flour of sulfur to the dry mixture and after placing it in position as the top coating of a roadway wetting it with a saturated solution of silicate of soda and then with the brine or alkaline solution, the effect being to quicken the setting of the concrete and make the unity of the component parts more binding and producing a very hard surface. The proportion of flour of sulfur varies from one to two per cent., and the union is formed of the iron and sulfur and other materials, which is greatly facilitated by saturation with the soda solution. A mass is thereby formed free from any tendency to crumble either by action of frost, excessive moisture or dryness, or from other natural causes.

In using the concrete for making a walk or roadway the bed is laid with coarse stones evened up with broken stone. The dry materials, consisting of small stone or gravel, earthy matter, and iron mixed with flour of sulfur, is then sifted or spread over the bed and pounded to fill the interstices to make a smooth surface. The surface is then wetted or saturated with the solution of silicate of soda and afterward with the salt solution.

I claim as my invention—

A concrete composed of small stones or gravel, sand or earthy material, iron oxidated or comminuted and flour of sulfur, mixed dry, and hardened by wetting with saturated solutions of silicate of soda and salt, substantially as set forth.

WINIFRED M. ROBINSON.

Witnesses:
ANDREW J. LITCHFIELD,
HORACE T. FOGG.